(12) United States Patent
Kawahira et al.

(10) Patent No.: US 9,018,546 B2
(45) Date of Patent: Apr. 28, 2015

(54) SEATING SENSOR WITH COMPACTLY ARRANGED ELEMENTS

(75) Inventors: Tetsuya Kawahira, Sakura (JP); Takashi Furukawa, Wako (JP)

(73) Assignees: Fujikura Ltd., Tokyo (JP); Honda Motor Co., Ltd., Tokyo (JP)

( * ) Notice: Subject to any disclaimer, the term of this patent is extended or adjusted under 35 U.S.C. 154(b) by 553 days.

(21) Appl. No.: 13/306,649

(22) Filed: Nov. 29, 2011

(65) Prior Publication Data

US 2012/0125698 A1 May 24, 2012

Related U.S. Application Data

(63) Continuation of application No. PCT/JP2010/058090, filed on May 13, 2010.

(30) Foreign Application Priority Data

May 29, 2009 (JP) ................................. 2009-131506

(51) Int. Cl.
| | | |
|---|---|---|
| H01H 13/16 | (2006.01) | |
| A47C 7/62 | (2006.01) | |
| H01H 13/712 | (2006.01) | |
| B60N 2/44 | (2006.01) | |
| B60R 21/015 | (2006.01) | |
| H01H 3/14 | (2006.01) | |
| B60N 2/00 | (2006.01) | |
| H01H 13/18 | (2006.01) | |
| H01H 13/702 | (2006.01) | |

(52) U.S. Cl.
CPC .............. *H01H 3/141* (2013.01); *B60N 2/002* (2013.01); *H01H 13/18* (2013.01); *H01H 13/702* (2013.01); *H01H 2231/026* (2013.01); *H01H 2003/147* (2013.01); *B60R 2021/01516* (2014.10)

(58) Field of Classification Search
CPC ... H01H 3/141; B60N 2/002; G01G 19/4142; B60R 21/015
USPC ......... 177/136, 144; 200/85 A, 512; 340/667; 180/273; 280/735
See application file for complete search history.

(56) References Cited

U.S. PATENT DOCUMENTS

| | | | | |
|---|---|---|---|---|
| 3,718,791 A | * | 2/1973 | Szablowski | 200/85 A |
| 3,859,485 A | * | 1/1975 | Blinkilde et al. | 200/85 A |
| 5,895,900 A | * | 4/1999 | Okada et al. | 200/85 R |

(Continued)

FOREIGN PATENT DOCUMENTS

| | | |
|---|---|---|
| CN | 1129385 C | 12/2003 |
| CN | 1791954 A | 6/2006 |

(Continued)

OTHER PUBLICATIONS

International Search Report of PCT/JP2010/058090, mailing date Jul. 13, 2010.

(Continued)

*Primary Examiner* — Randy W Gibson
(74) *Attorney, Agent, or Firm* — Westerman, Hattori, Daniels & Adrian, LLP

(57) ABSTRACT

The present invention relates to a seating sensor 100. the base table 10 includes a first part 11 provided with the sensor portion 1 and a second part 12 provided with the connector portion 2, and the second part 12 is arranged within a minimum rectangular area S1 containing the first part 11.

3 Claims, 9 Drawing Sheets

(56) References Cited

U.S. PATENT DOCUMENTS

| | | | |
|---|---|---|---|
| 5,896,090 A * | 4/1999 | Okada et al. | 340/667 |
| 5,986,221 A * | 11/1999 | Stanley | 177/136 |
| 6,371,552 B1 * | 4/2002 | Narita et al. | 297/180.12 |
| 6,392,178 B1 * | 5/2002 | Kuratani | 200/512 |
| 6,450,046 B1 * | 9/2002 | Maeda | 73/862.473 |
| 6,546,822 B1 | 4/2003 | Tahara et al. | |
| 6,750,412 B2 * | 6/2004 | Ito et al. | 200/85 A |
| 6,794,590 B2 * | 9/2004 | Federspiel | 200/85 R |
| 6,918,612 B2 * | 7/2005 | Smith et al. | 280/735 |
| 7,304,256 B2 * | 12/2007 | Kawahira et al. | 200/85 A |
| 7,528,333 B2 * | 5/2009 | Kawahira et al. | 200/85 A |
| 8,009,056 B2 * | 8/2011 | Greene | 340/667 |
| 8,013,264 B2 * | 9/2011 | Kawahira et al. | 200/85 A |
| 8,044,311 B2 * | 10/2011 | Kawahira et al. | 200/85 A |
| 8,053,692 B2 * | 11/2011 | Kawahira et al. | 200/85 A |
| 8,115,648 B2 * | 2/2012 | Lorenz et al. | 340/667 |
| 8,258,417 B2 * | 9/2012 | Kawahira et al. | 200/85 A |
| 2006/0278513 A1 | 12/2006 | Kawahira et al. | |
| 2008/0191527 A1 | 8/2008 | Takai et al. | |
| 2009/0127089 A1 | 5/2009 | Kawahira et al. | |

FOREIGN PATENT DOCUMENTS

| | | | | |
|---|---|---|---|---|
| DE | 10 2007 039 234 A1 | | 3/2008 | |
| EP | 0930032 A1 | | 7/1999 | |
| JP | 11-297157 | * | 10/1999 | H01H 13/52 |
| JP | 2001-133340 A | | 5/2001 | |
| JP | 2005-038828 | * | 2/2005 | H01H 13/16 |
| JP | 2007-066914 | * | 3/2007 | H01H 13/16 |
| JP | 2008-153232 | * | 7/2008 | H01H 13/16 |
| JP | 2008-153232 A | | 7/2008 | |
| JP | 2008-305809 | * | 12/2008 | H01H 13/16 |

OTHER PUBLICATIONS

Extended European Search Report dated Jun. 6, 2014, issued in corresponding European Patent Application No. 10780419.7, (7 pages).

* cited by examiner

SEATING SENSOR WITH COMPACTLY ARRANGED ELEMENTS

TECHNICAL FIELD

The present invention relates to a seating sensor.

BACKGROUND ART

Currently, as one of safety systems for an occupant in a vehicle, an alarm system in which wearing of a seatbelt is detected when the occupant gets in the vehicle, and in which an alarm is issued in a case where the seatbelt is not worn, is put to practical use. In such an alarm system, seating of the occupant is detected, and the alarm is issued in a case where the seatbelt is not worn when the occupant is seated. For this detection of the seating of the occupant, a seating sensor arranged at a cushion pad under a surface cover at a seating part of a seat and detecting a load by the seating of the occupant is used in some cases.

Patent Literature 1 described below describes such a seating sensor. The seating sensor described in Patent Literature 1 includes a pair of sensor portions having a plurality of on/off-type pressure-sensitive sensors and a wire connected to the respective pressure-sensitive sensors and a connector portion having a connector and a wire extending between the sensor portions constituting a pair, connected at one end to the pair of sensor portions, and connected at the other end to the connector. The pair of sensor portions and the connector portion are formed on a film-like base table and are integrated.

CITATION LIST

Patent Document

Patent DOCUMENT 1: JP-A No. 2001-133340

SUMMARY OF THE INVENTION

Objects to be Achieved by the Invention

However, in the seating sensor described in Patent Literature 1, at the connector portion, the connector is arranged between the plurality of pressure-sensitive sensors, and the wire connected to the connector extends from a location between the pressure-sensitive sensors to a location away from the pressure-sensitive sensors. Further, at the sensor portion, the wire connected to the pressure-sensitive sensors extends to the location away from the pressure-sensitive sensors. At the location away from the pressure-sensitive sensors, the wire connected to the connector and the wire connected to the pressure-sensitive sensors are connected. In this manner, since the wires extend to the location away from the pressure-sensitive sensors and the connector, the seating sensor tends to be enlarged, which disables inexpensive manufacturing in some cases due to concerns about an increased material cost.

It is an object of the present invention to provide a seating sensor that can be manufactured inexpensively.

Means for Achieving the Objects

A seating sensor of the present invention is a seating sensor arranged in an inside of a seat to detect seating of a person, including a film-like base table, a sensor portion having three or more switches conducted by a pressing force by the seating of the person and a first conductor connected to the respective switches and arranged within a minimum rectangular area containing the respective switches, and a connector portion having a terminal and a second conductor connecting the terminal to the first conductor, wherein the base table includes a first part provided with the sensor portion and a second part provided with the connector portion, and wherein the second part is arranged within a minimum rectangular area containing the first part.

With such a seating sensor, the first conductor connected to the three or more respective switches is arranged within the minimum rectangular area containing the respective switches. Since the first conductor does not extend to the outside from the minimum rectangular area containing the respective switches, the sensor portion is reduced in size. Further, the second part of the base table at which the terminal and the second conductor are provided is arranged within the minimum rectangular area containing the first part of the base table at which the sensor portion reduced in size as described above is provided. Since the second part of the base table does not extend to the outside from the minimum rectangular area containing the first part, the seating sensor is housed within the minimum rectangular area containing the first part. Accordingly, more seating sensors can be formed on a film-like sheet as a material for the base table than in a case of another seating sensor having the same switch arrangement. Thus, the present seating sensor enables reduction in a material cost and inexpensive manufacturing.

Further, in the above seating sensor, four or more of the switches are preferably provided, the four or more switches are preferably constituted by a first switch group consisting of two or more of the switches and a second switch group consisting of the other two or more of the switches, the first switch group and the second switch group preferably constitute OR circuits respectively, and the first switch group and the second switch group preferably constitute an AND circuit.

With such a seating sensor, since the AND circuit is constituted by the first switch group and the second switch group, a pressing force applied only to switches in either the first switch group or the second switch group is not determined as the seating of an occupant even when it is applied, which can prevent false detection. Further, the first switch group and the second switch group constitute the OR circuits respectively, and thus, when at least one switch in the first switch group and at least one switch in the second switch group are turned on, the seating of the occupant can be detected, which enables accurate detection of the seating of the occupant.

Effects of the Invention

The present invention provides a seating sensor that is reduced in size and can be manufactured inexpensively.

BEST MODE FOR CARRYING OUT THE INVENTION

Hereinafter, preferred embodiments of a seating sensor according to the present invention will be described in details with reference to the accompanying drawings.

First Embodiment

Figure 1:
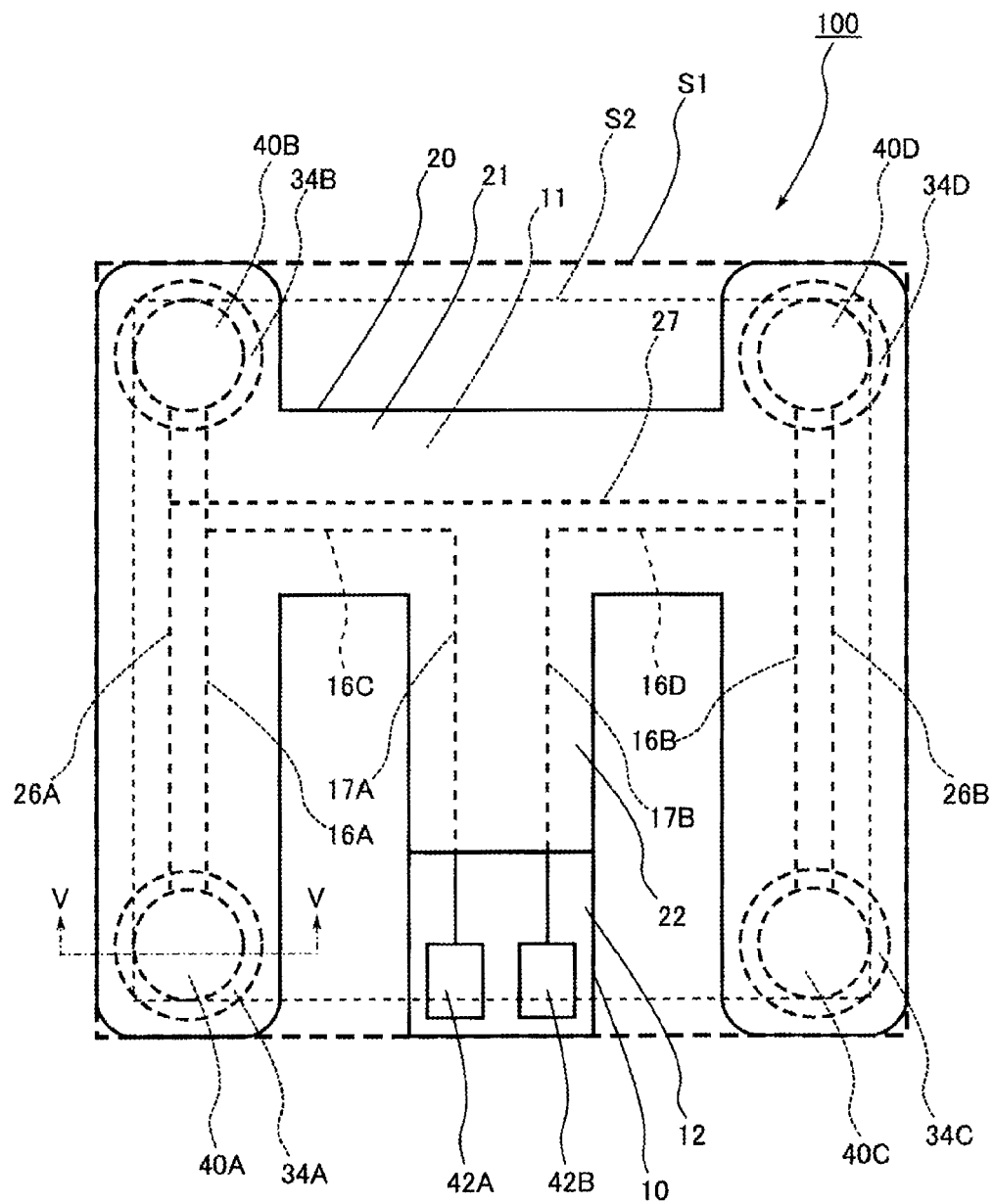
FIG. 1 is a plan view illustrating a seating sensor according to a first embodiment of the present invention.

FIG. 1 is a plan view illustrating a seating sensor according to a first embodiment of the present invention.

As shown in FIG. 1, a seating sensor 100 includes a first electrode sheet 10, a second electrode sheet 20 overlapped with the first electrode sheet 10, and a spacer sandwiched between the first electrode sheet 10 and the second electrode sheet 20 as main components.

Figure 2:
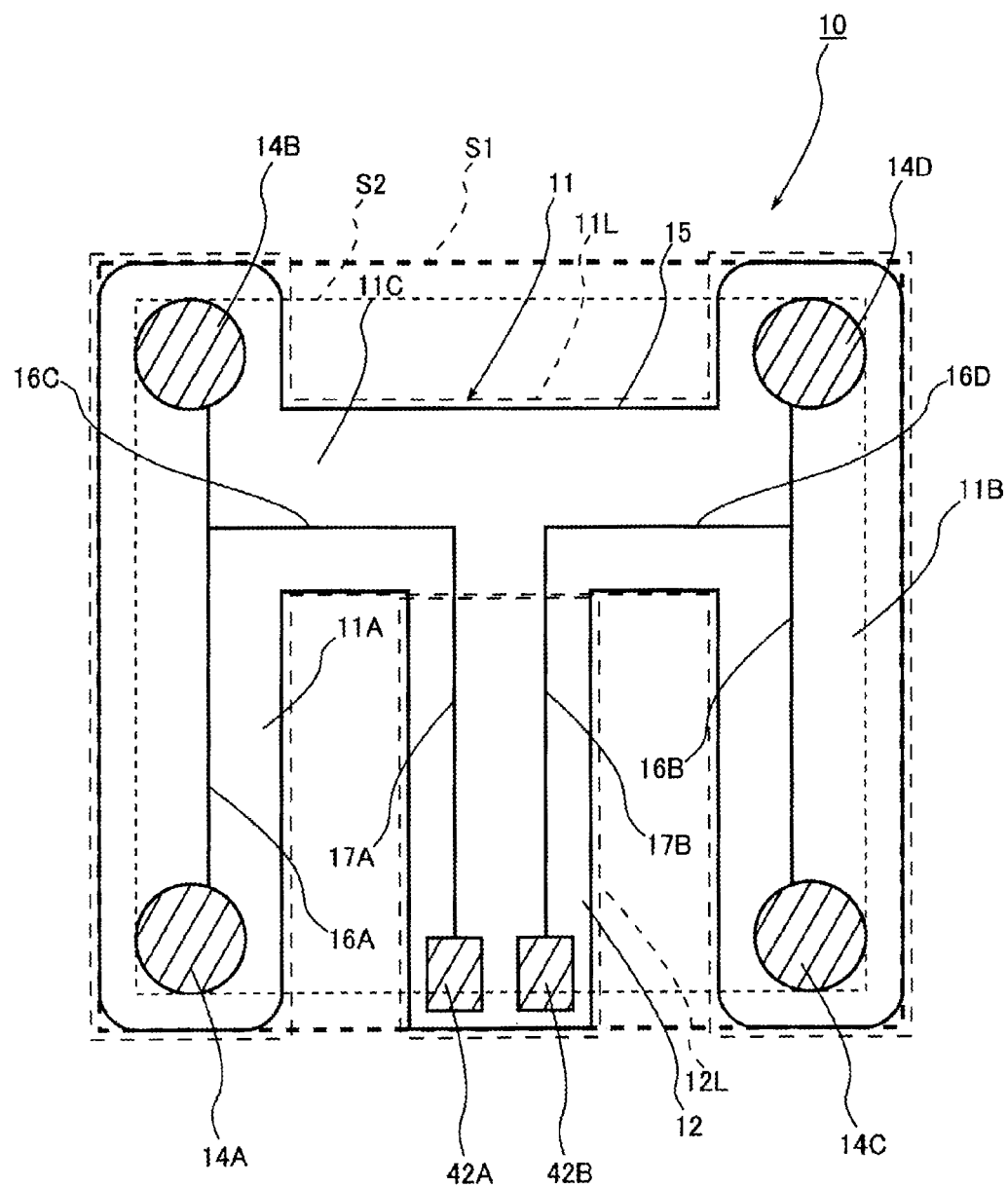
FIG. 2 is a plan view illustrating a first electrode sheet shown in FIG. 1.

FIG. 2 is a plan view illustrating the first electrode sheet 10 shown in FIG. 1.

As shown in FIG. 2, the first electrode sheet 10 has a flexible film-like first insulating sheet 15 as a base table, first electrodes 14A to 14D formed on the surface of the first insulating sheet 15, and terminals 42A and 42B formed on the surface of the first insulating sheet 15 as main components.

The first insulating sheet 15 includes a first part 11 and a second part 12. The first part 11 includes a pair of strip-like lateral portions 11A and 11B having equal shapes and parallel to each other and a strip-like intermediate portion 11C extending in a direction perpendicular to the lateral portions 11A and 11B between the lateral portions 11A and 11B and connected to respective intermediate parts of the lateral portions 11A and 11B. In this manner, the first part 11 is formed approximately in an H shape shown to be surrounded by a dotted line 11L. Further, the second part 12 is formed in a strip shape, extends in a direction perpendicular to the intermediate portion 11C of the first part, is connected at one end to an intermediate part of the intermediate portion 11C, and has the other end as a free end. Thus, the second part 12 and the intermediate portion 11C approximately form a T shape. In FIG. 2, the second part 12 is surrounded by a dotted line 12L.

Further, an edge of the second part 12 on the free end side is located on a line connecting respective edges of the lateral portions 11A and 11B of the first part 11 on a side on which the second part 12 is formed. Accordingly, the second part 12 of the first insulating sheet 15 is housed without protruding from an inside of a minimum rectangular area S1 containing the first part 11 of the first insulating sheet 15.

Further, the first electrodes 14A to 14D are formed approximately in circular shapes and are provided on the first part 11. Specifically, the first electrodes 14A and 14B are provided on the surface of the lateral portion 11A to be spaced at predetermined distances from edges of both the ends of the lateral portion 11A of the first part 11, respectively. In addition, the first electrode 14A and the first electrode 14B are connected to a linear first conductor 16A provided between the first electrode 14A and the first electrode 14B on the surface of the lateral portion 11A. In the middle of the first conductor 16A, a first conductor 16C is branched and extends on the intermediate portion 11C. Further, the first electrodes 14C and 14D are provided on the surface of the lateral portion 11B to be spaced at predetermined distances from edges of both the ends of the lateral portion 11B of the first part 11, respectively. In addition, the first electrode 14C and the first electrode 14D are connected to a linear first conductor 16B provided between the first electrode 14C and the first electrode 14D on the surface of the lateral portion 11B. In the middle of the first conductor 16B, a first conductor 16D is branched and extends on the intermediate portion 11C.

In this manner, the linear first conductor 16A is provided between the first electrode 14A and the first electrode 14B, the linear first conductor 16B is provided between the first electrode 14C and the first electrode 14D, and the first conductor 16C and the first conductor 16D extend to the side of the intermediate portion 11C from the first conductor 16A and the first conductor 16B, respectively. Accordingly, the first conductors 16A to 16D are arranged within a minimum rectangular area S2 containing the respective first electrodes 14A to 14D.

Further, the terminals 42A and 42B are formed approximately in rectangular shapes and are provided side by side in a direction perpendicular to a longitudinal direction of the second part 12 at locations on the surface of the second part 12 spaced at predetermined distances from the edge on the free end side. In addition, the terminal 42A is connected to a second conductor 17A provided on the surface of the second part 12, and the terminal 42B is connected to a second conductor 17B provided on the surface of the second part. The second conductors 17A and 173 extend in parallel with each other along the longitudinal direction of the first part 12. The second conductor 17A is connected to the first conductor 16C at the intermediate portion 11C while the second conductor 17B is connected to the first conductor 16D at the intermediate portion 11C.

Figure 3:
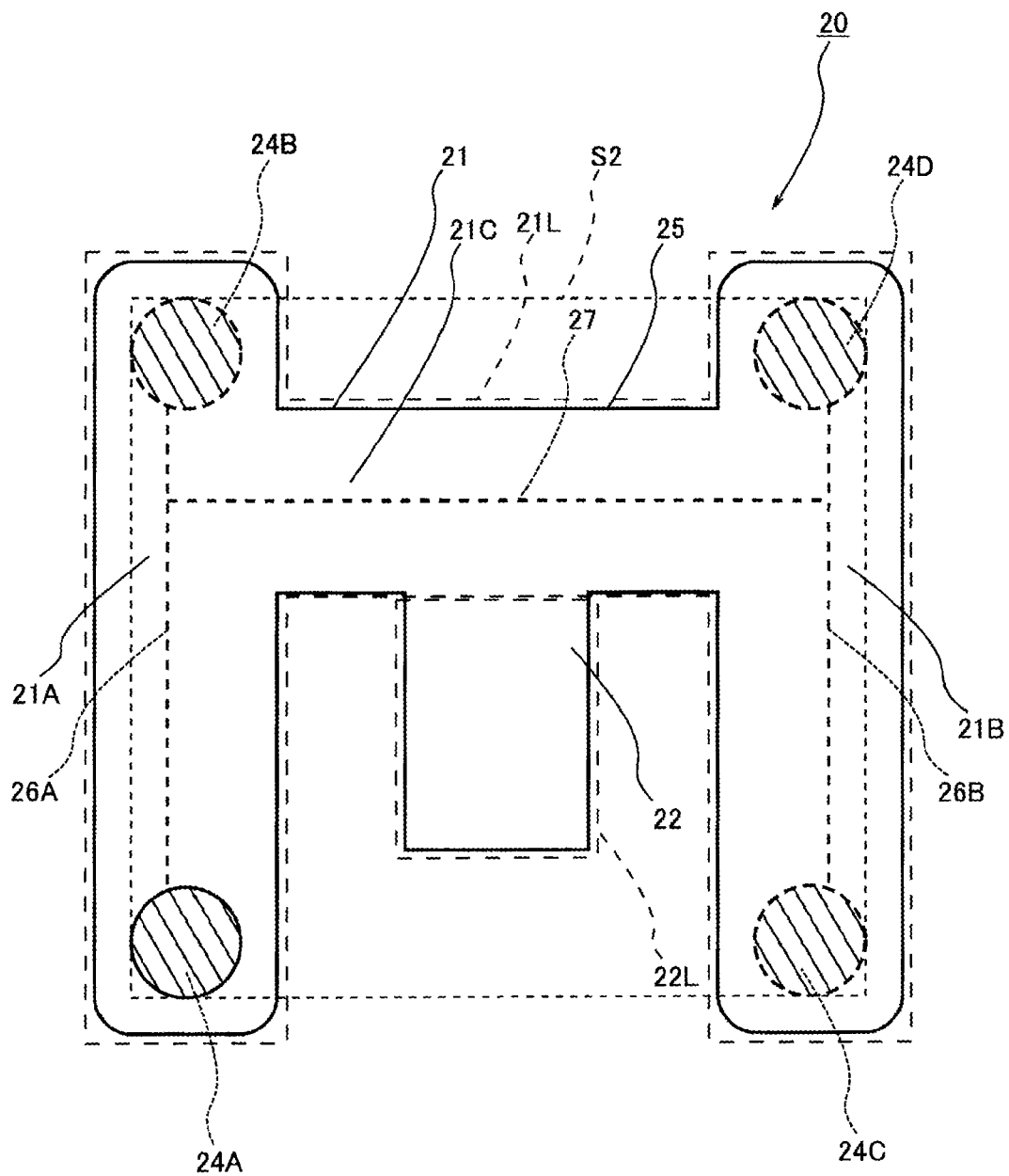
FIG. 3 is a plan view illustrating a second electrode sheet shown in FIG. 1.

FIG. 3 is a plan view illustrating the second electrode sheet shown in FIG. 1.

As shown in FIG. 3, the second electrode sheet has a flexible film-like second insulating sheet 25 and second electrodes 24A to 24D formed on the surface of the second insulating sheet 25 as main components.

The second insulating sheet 25 includes a first part 21 and a second part 22. The first part 21 of the second insulating sheet 25 includes a pair of strip-like lateral portions 21A and 21B having equal shapes and parallel to each other and a strip-like intermediate portion 21C extending in a direction perpendicular to the lateral portions 21A and 21B and connected to respective intermediate parts of the lateral portions 21A and 21B between the lateral portions 21A and 21B. The first part 21 of the second insulating sheet 25 corresponds to the first part 11 of the first insulating sheet 15 in shape. Accordingly, the first part 21 is formed approximately in an H shape surrounded by a dotted line 211. Further, the second part 22 of the second insulating sheet 25 is formed in a strip shape having an equal width to and having a shorter length than those of the second part 12 of the first insulating sheet 15, extends in a direction perpendicular to the intermediate portion 21C, is connected at one end perpendicularly to an intermediate part of the intermediate portion 21C, and has the other end as a free end. The second part 22 of the second insulating sheet 25 is long enough for the terminals 42A and 42B of the first electrode sheet 10 to be exposed in a state where the second electrode sheet 20 and the first electrode sheet 10 are aligned and overlapped as shown in FIG. 1. In FIG. 3, the second part 22 is surrounded by a dotted line 22L.

Further, the second electrodes 24A to 24D have equal shapes and sizes to those of the first electrodes 14A to 14D. In addition, the second electrodes 24A to 24D are provided at locations, overlapped with the first electrodes 14A to 14D, on the surface of the second insulating sheet 25 on the side of the first electrode sheet 10 when the second insulating sheet 25 is overlapped with the first electrode sheet 10. Further, the second electrode 24A and the second electrode 24B are connected to a linear first conductor 26A provided between the second electrode 24A and the second electrode 24B on the surface of the second insulating sheet 25. Further, the second electrode 24C and the second electrode 24D are connected to a linear first conductor 26B provided between the second electrode 24C and the second electrode 24D on the surface of the second insulating sheet 25. Further, the first conductor 26A and the first conductor 26B are connected to a first conductor 27 formed on the surface of the intermediate portion 21C of the second insulating sheet 25.

In this manner, the linear first conductor 26A is provided between the second electrodes 24A and 24B, the linear first conductor 26S is provided between the second electrodes 24C and 24D, and the first conductor 27 is connected to the first conductor 26A and the first conductor 26B. Accordingly, when the second insulating sheet 25 is overlapped with the first electrode sheet 10, and the second insulating sheet 25 is seen in a direction perpendicular to the second insulating sheet 25, the first conductors 26A, 26B, and 27 are arranged within the minimum rectangular area S2 containing the respective first electrodes 14A to 14D.

Figure 4:
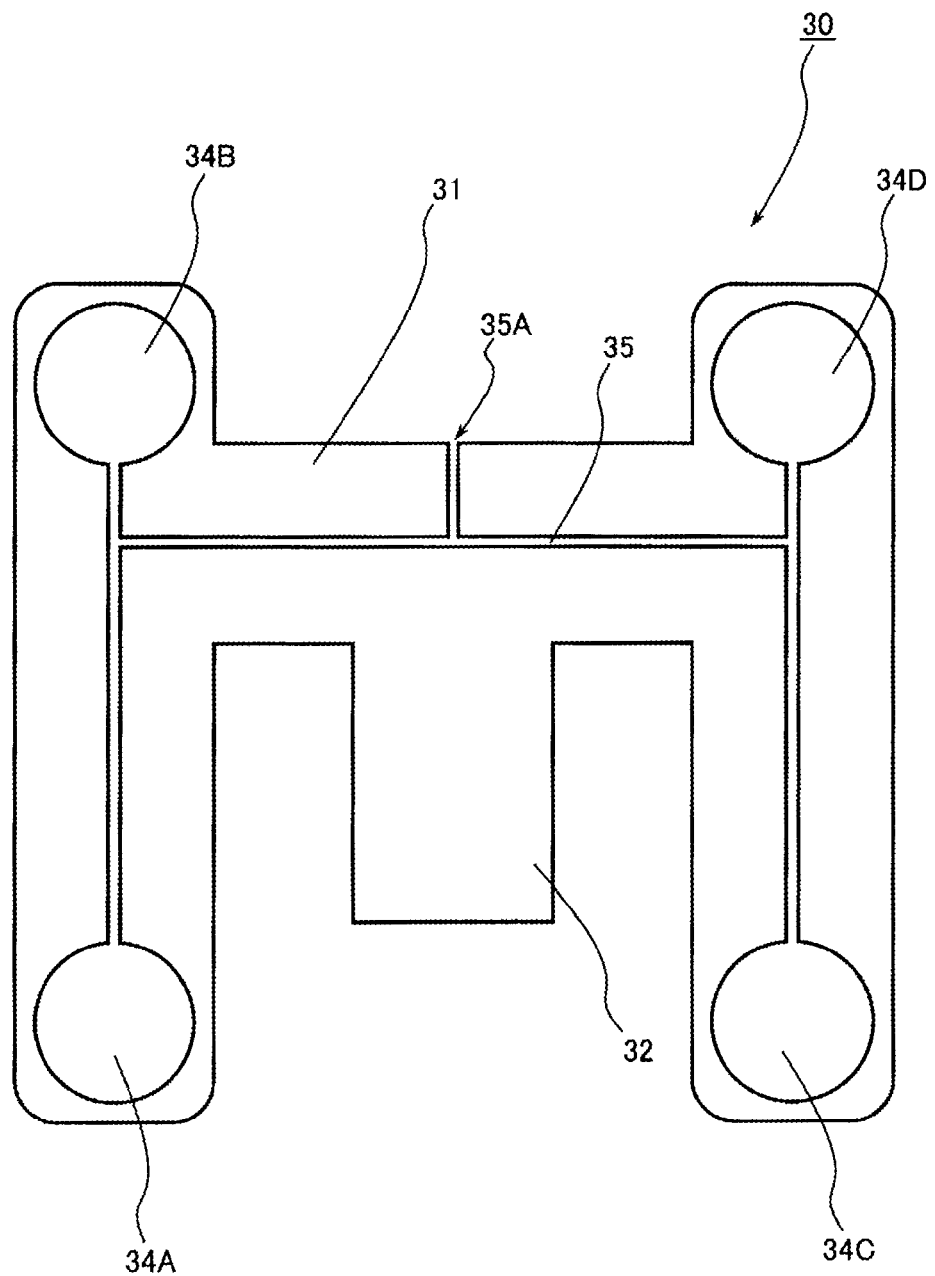
FIG. 4 is a plan view illustrating a spacer.

FIG. 4 is a plan view illustrating the spacer sandwiched between the first electrode sheet 10 and the second electrode sheet 20.

A spacer 30 is made of a flexible insulating sheet. As shown in FIG. 4, the spacer 30 corresponds to the second electrode sheet 20 in external shape.

Further, opening portions 34A to 34D are formed at the spacer 30. The opening portions 34A to 34D are formed approximately in circular shapes at the circumferences and are formed to have larger diameters than those of the first electrodes 14A to 14D. The opening portions 34A to 34D are formed at locations to allow the first electrodes 14A to 14D to be arranged inside the opening portions 34A to 34D in a case where the spacer 30 is overlapped with the first electrode sheet 10, and where the spacer 30 is seen in a direction perpendicular to the spacer 30. Further, the opening portions 34A to 34D are connected to a slit 35 for air release, and the slit 35 communicates with the outside of the spacer 30 by an air exhaust port 35A.

Meanwhile, on both surfaces of the spacer 30 is applied a not shown adhesive for adhesion to the first electrode sheet 10 and the second electrode sheet 20.

Figure 5:
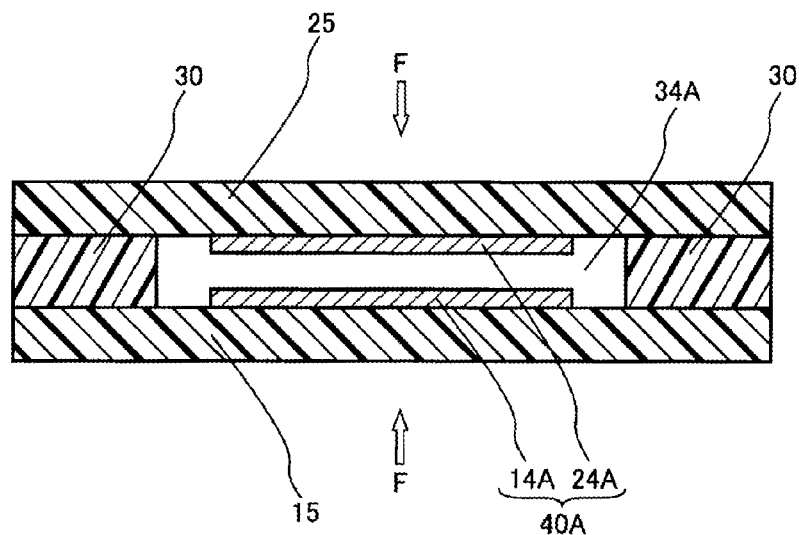
FIG. 5 is a cross-sectional view illustrating a cross-sectional state along the line V-V in FIG. 1.
Figure 6:
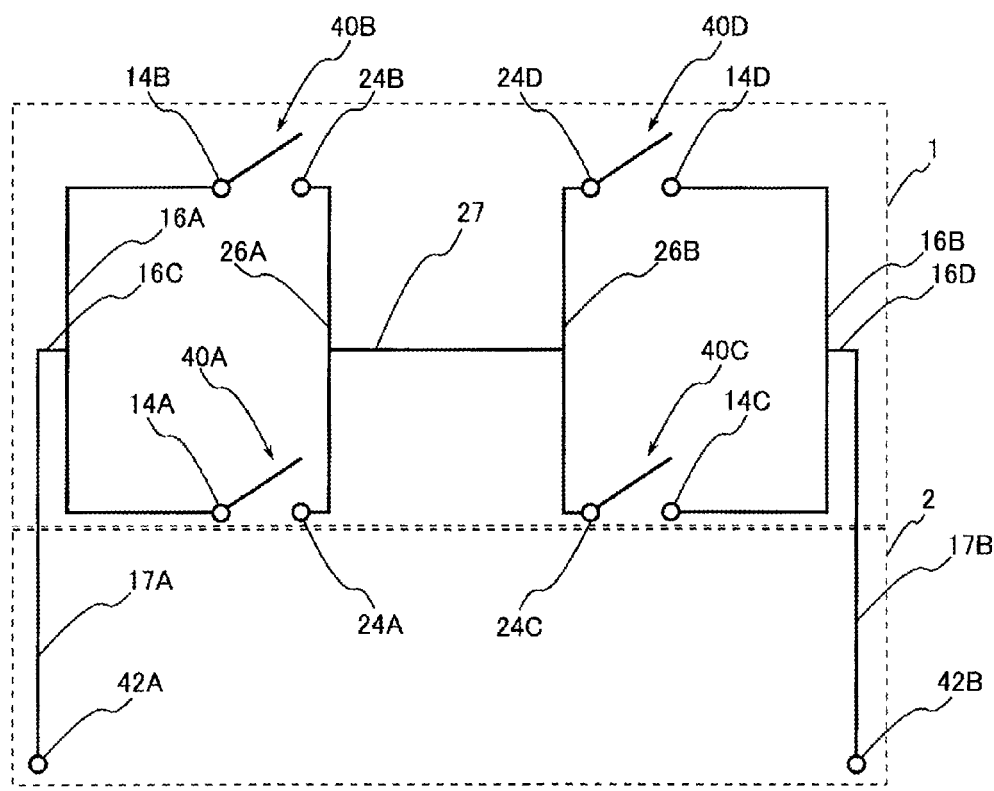
FIG. 6 is a circuit diagram illustrating a circuit configuration of the seating sensor shown in FIG. 1 as an equivalent circuit.
Figure 7:
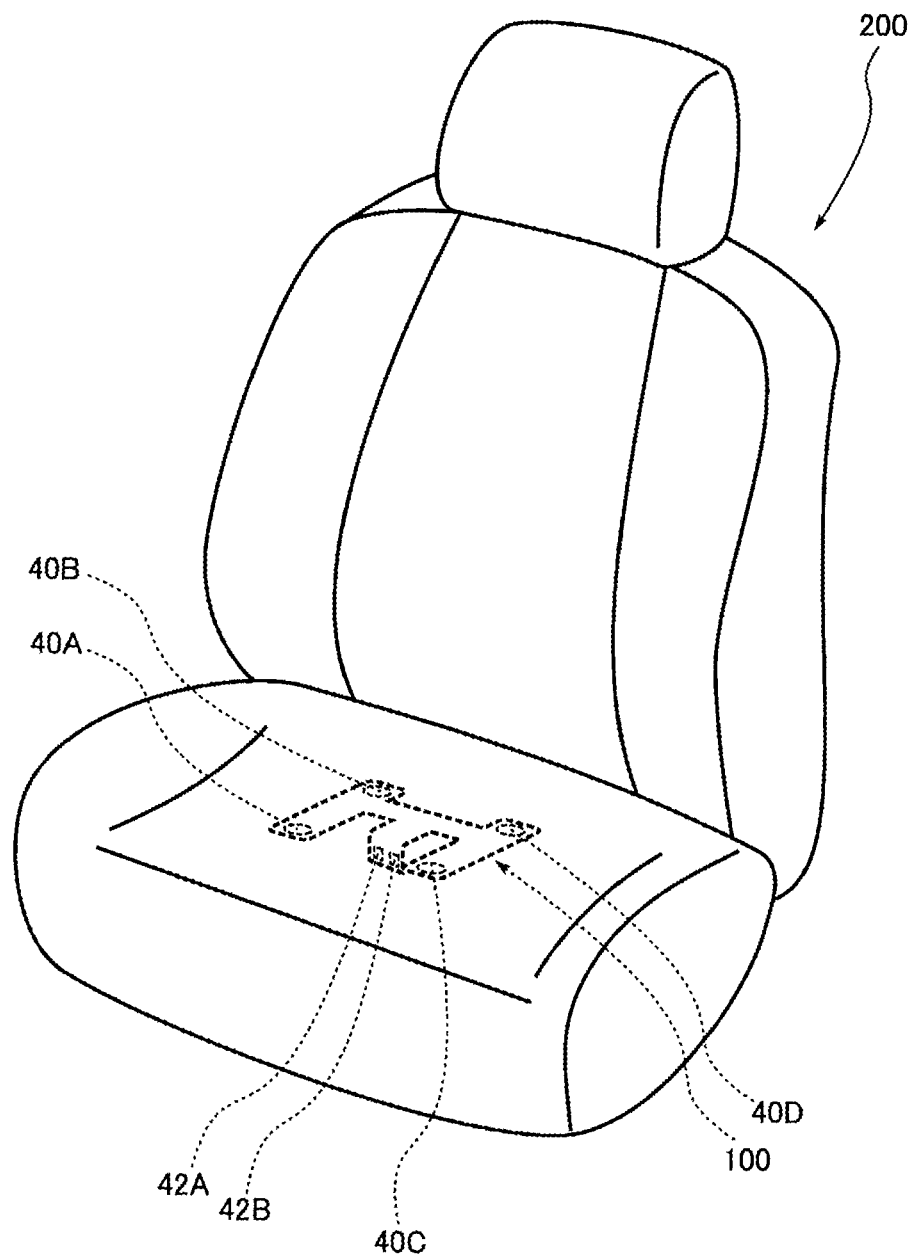
FIG. 7 illustrates a state in which the seating sensor shown in FIG. 1 is arranged in a seat.

Next, an overall configuration of the seating sensor 100 will be described with reference to FIGS. 1, 5, 6, and 7. FIG. 5 is a cross-sectional view illustrating a cross-sectional state along the line V-V shown in FIG. 1, FIG. 6 is a circuit diagram illustrating a circuit configuration of the seating sensor 100 shown in FIG. 1 as an equivalent circuit, and FIG. 7 illustrates a state in which the seating sensor 100 shown in FIG. 1 is arranged in a seat.

In the seating sensor 100, the first electrode sheet 10 and the second electrode sheet 20 are overlapped with the spacer 30 inbetween and are fixed to each other and integrated by the adhesive applied on both the surfaces of the spacer 30, as described above.

At this time, the first electrodes 14A to 14D of the first electrode sheet 10 and the second electrodes 24A to 24D of the second electrode sheet 20 are completely overlapped in a case where the seating sensor 100 is seen in a direction perpendicular to the seating sensor 100 to constitute switches 40A to 40D. Hence, a minimum rectangular area containing the respective switches 40A to 40D is an equal area to the minimum rectangular area S2 containing the respective first electrodes 14A to 14D. Accordingly, the first conductors provided on the first insulating sheet 15 and the second insulating sheet 25 are arranged within the minimum rectangular area S2 containing the respective switches 40A to 40D.

Further, each of the switches 40A to 40D configured in this manner detects a pressing force. This state will be described with reference to FIGS. 1 and 5. The first electrode 14A of the first electrode sheet 10 and the second electrode 24A of the second electrode sheet 20 are arranged inside the opening portion 34A provided in the spacer 30 in a case where the seating sensor 100 is seen in the direction perpendicular to the seating sensor 100 as described above. The first electrode 14A and the second electrode 24A are opposed to each other to be spaced at a predetermined distance by the spacer 30 as shown in FIG. 5. In this manner, the switch 40A is constituted by the first electrode 14A and the second electrode 24A on the first insulating sheet 15.

Meanwhile, the insulating sheet 15 provided with the first electrode 14A and the insulating sheet 25 provided with the second electrode 24A are respectively flexible film-like sheets. Thus, in a case where the second insulating sheet 25 is more excellent in flexibility than the first insulating sheet 15, the second insulating sheet 25 is flexed to cause the second electrode 24A to contact the first electrode 14A when pressing forces F are applied in directions perpendicular to both the surfaces of the seating sensor 100. On the other hand, in a case where the first insulating sheet 15 is more excellent in flexibility than the second insulating sheet 25, the first insulating sheet 15 is flexed to cause the first electrode 14A to contact the second electrode 24A when the pressing forces F are applied in the directions perpendicular to both the surfaces of the seating sensor 100. In this manner, the contact between the first electrode 14A and the second electrode 24A causes the switch 40A to be turned on. Meanwhile, when the second insulating sheet 25 or the first insulating sheet 15 is flexed, air in the opening portion 34A is exhausted from the slit 35 shown in FIG. 4, and thus the second insulating sheet 25 or the first insulating sheet 15 can be flexed appropriately when the pressing forces F are applied.

The switches 40A to 40D configured in this manner are connected to one another by the first conductors 16A and 16B formed on the surface of the first part 11 of the first insulating sheet 15 and the first conductors 26A, 26B, and 27 formed on the surface of the first part 21 of the second insulating sheet 25 as shown in FIG. 6. The respective switches 40A to 40D are connected in this manner to constitute a sensor portion 1, and the sensor portion 1 is provided on the first part 11 of the first insulating sheet 15. It is to be noted that the entirety of the sensor portion 1 does not need to contact the first insulating sheet 15 as long as the sensor portion 1 is provided on the first insulating sheet 15.

Conduction between the terminal 42A and the terminal 42B in a case where at least one of the switch 40A and the switch 40B of the sensor portion 1 provided in this manner and at least one of the switch 40C and the switch 40D are turned on leads to detection of seating of an occupant. In other words, as for a switch group consisting of the switch 40A and the switch 40B, an OR circuit is constituted by the switch 40A and the switch 40B. Similarly, as for a switch group consisting of the switch 40C and the switch 405, an OR circuit is constituted by the switch 40C and the switch 40D. Further, an AND circuit is constituted by the switch group consisting of the switch 40A and the switch 40B and the switch group consisting of the switch 40C and the switch 40D.

In addition, as shown in FIG. 6, to the first conductors 16C and 16D connected to the first conductors 16A and 16B of this sensor portion are connected the second conductors 17A and 17B constituting a connector portion 2.

Such a seating sensor 100 is arranged on a cushion pad under a surface cover at a seat 200 of a vehicle or the like as shown in FIG. 7. At this time, in the seating sensor 100, the switches 40A and 40B are arranged on one side with reference to a line passing at the center of the seat 200 in a direction in which a person seated is directed, and the switches 40C and 40D are arranged on the other side. In the cushion pad under the surface cover at the seat 200 is provided a hole, and the hole is in an elongated shape in a direction perpendicular to the direction in which the person seated is directed on the surface of the cushion pad. In the seating sensor 100, the second part of the first insulating sheet provided with the connector portion 2 is bent and inserted into the inside of the cushion pad through this hole. The terminals 42A and 42B are electrically connected to not shown external power supply and measuring portion, and voltage is applied to the terminals 42A and 42B. In this manner, a sensed signal sensed by the sensor portion 1 is output to the not shown measuring portion to detect the seating of the occupant.

Next, materials constituting the seating sensor 100 will be described.

The insulating sheet 15 of the first electrode sheet 10, the insulating sheet 25 of the second electrode sheet 20, and the spacer 30 are made of a flexible insulating resin. Examples of the resin include polyethylene terephthalate (PET), polyethylene naphthalate (PEN), and polyimide (PI). Among these, PEN is preferable in terms of heat resistance. It is to be noted that, in a case where the second insulating sheet 25 is more excellent in flexibility than the first insulating sheet 15, PEN, which is excellent in heat resistance, may be used for the second insulating sheet 25, which has a larger flexing amount at locations at which the switches 40A to 40D are provided, while PET, which is inexpensive, may be used for the first insulating sheet 15. On the other hand, in a case where the first insulating sheet 15 is more excellent in flexibility than the second insulating sheet 25, PEN may be used for the first insulating sheet 15 while PET may be used for the second insulating sheet 25.

As the adhesive applied on both the surfaces of the spacer 30, an acrylic adhesive is preferable, and an example of this is one based on an acrylic polymer using one or more kinds of (meth)acrylic alkyl ester as monomer components.

Further, the first electrodes 14A to 14D, the second electrodes 24A to 24D, the first conductors 16A to 16D, 26A, 26B, and 27, the second conductors 17A and 17B, and the terminals 42A and 42B are made of a conductive paste, a metallic foil formed by plating, or the like. Some of them may be made of the conductive paste while the other parts may be made of the metallic foil by plating. Examples of the conductive paste include various metallic pastes such as a silver paste and a carbon paste. Further, examples of the metallic foil formed by plating include copper, nickel, and a laminated body of these.

Next, a method for manufacturing the seating sensor 100 will be described.

First, the first electrode sheet 10, the second electrode sheet 20, and the spacer 30 before being punched are prepared (preparing process).

As a preparation for the first electrode sheet 10, on one surface of a film-like insulating sheet that becomes the first insulating sheet 15 are formed the first electrodes 14A to 14D, the first conductors 16A to 16D, the second conductors 17A and 17B, and the terminals 42A and 42B (hereinafter, a first circuit pattern). At this time, a plurality of first circuit patterns are formed on one insulating sheet. In a case where each first circuit pattern is made of the conductive paste such as the silver paste, the conductive paste is applied and dried on a location on the insulating sheet at which the first circuit pattern is formed. In a case where each first circuit pattern is made by plating, the location on the insulating sheet at which the first circuit pattern is formed is plated. In this manner, the plurality of first circuit patterns are formed on the insulating sheet to bring a state in which the plurality of first electrode sheets 10 before being punched are connected to one another.

As formation of the second electrode sheet 20, on one surface of a film-like insulating sheet that becomes the second insulating sheet 25 are formed the second electrodes 24A to 24D and the first conductors 26A, 26B, and 27 (hereinafter, a second circuit pattern). At this time, a plurality of second circuit patterns are formed on one insulating sheet to align with the first circuit patterns. The second circuit patterns have only to be formed in a similar method to the method for forming the first circuit patterns on the insulating sheet. Meanwhile, locations of the second circuit patterns are adjusted so that the first electrodes and the second electrodes may be opposed when the insulating sheet on which the second circuit patterns are formed is overlapped on the insulating sheet on which the first circuit patterns are formed. Further, the insulating sheet on which the second circuit patterns are formed has formed therein an opening at a part corresponding to the terminals 42A and 42B so that the terminals 42A and 42B of the first electrode sheet may be exposed from the insulating sheet on which the second circuit patterns are formed when the insulating sheet on which the second circuit patterns are formed is overlapped on the insulating sheet on which the first circuit patterns are formed. In this manner, the plurality of second circuit patterns are formed on the insulating sheet to bring a state in which the plurality of second electrode sheets 20 before being punched are connected to one another.

As a preparation for the spacer 30, the adhesive is first applied on both the surfaces of an insulating sheet. Thereafter, the opening portions 34A to 34D and the slit 35 are formed by punching. At this time, a plurality of opening portions 34A to 34D and slits 35 are formed on one insulating sheet to align with the first circuit patterns.

The first electrode sheets 10, spacers 30, and second electrode sheets 20 before being punched prepared in this manner are aligned, overlapped, and integrated to sandwich the spacers 30 between the first electrode sheets 10 and the second electrode sheets 20 (integrating process).

Figure 8:
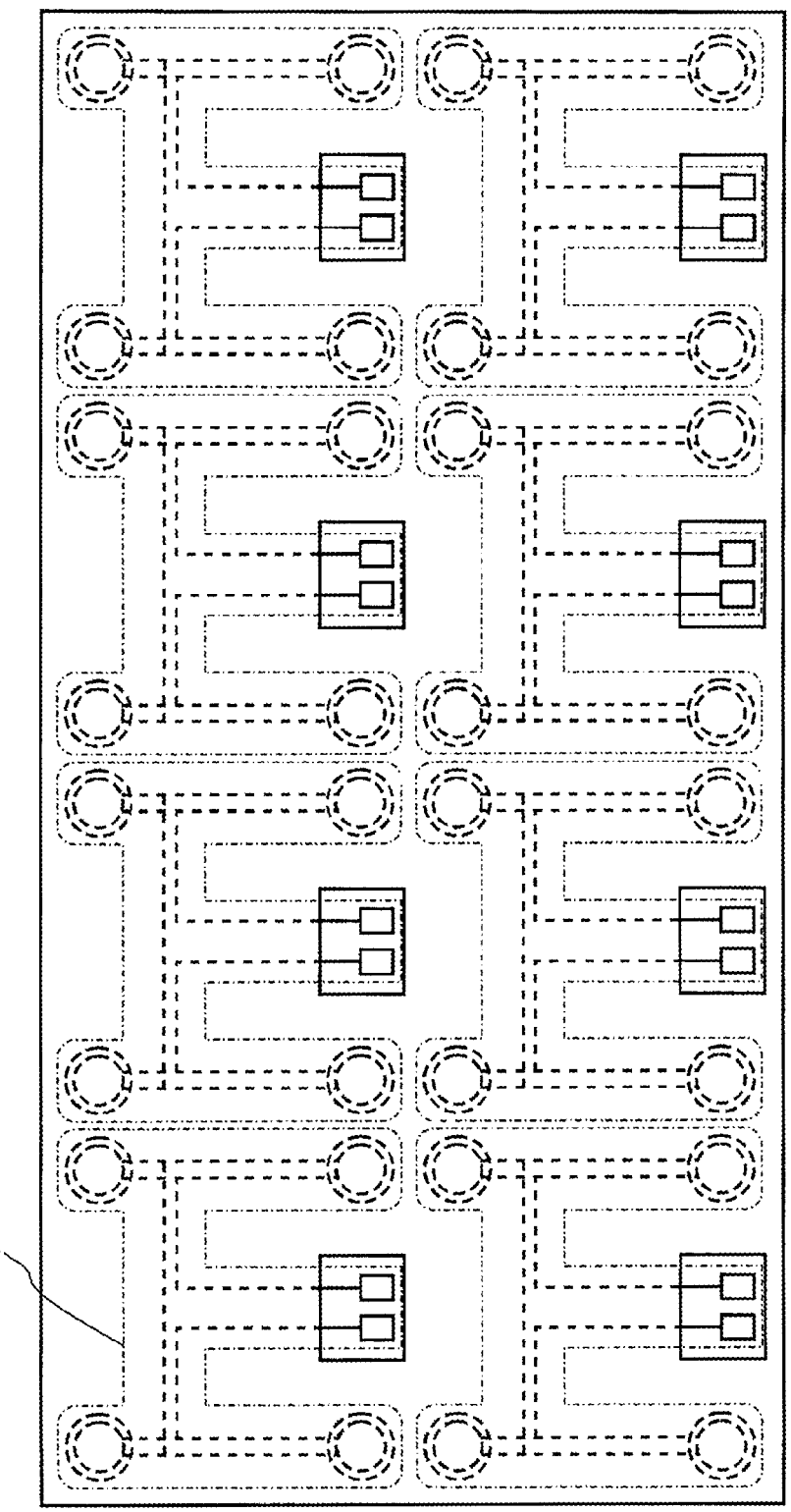
FIG. 8 is a plan view illustrating a state in which multiple seating sensors before being punched are formed.

FIG. 8 is a plan view illustrating a state in which the insulating sheet on which the plurality of spacers are formed and the insulating sheet on which the plurality of second circuit patterns are formed are overlapped on the insulating sheet on which the plurality of first circuit patterns are formed and integrated. That is, it is a plan view illustrating a state in which multiple seating sensors 100 before being punched are formed. As described above, in the seating sensor 100, the second part of the insulating sheet 15 is arranged within the minimum rectangular area S1 containing the first part of the insulating sheet 15 at which the sensor portion 1 is provided. Accordingly, as shown in FIG. 8, a distance between the adjacent seating sensors 100 can be minimum, and many seating sensors 100 are formed on the film-like insulating sheet as a material for the insulating sheet 15.

Subsequently, each seating sensor 100 is punched (punching process). Punching is done along the external shape of each seating sensor 100 shown in FIG. 8 by a punching machine.

In this manner, a plurality of seating sensors 100 are obtained.

With the seating sensor 100 according to the present embodiment, the first conductors 16A to 16D, 26A, 26B, and 27 connected to the respective switches 40A to 40D are arranged within the minimum rectangular area S2 containing the respective switches. Since the first conductors 16A to 16D, 26A, 26B, and 27 do not extend to the outside from the minimum rectangular area S2 containing the respective switches 40A to 40D, the sensor portion 1 is reduced in size. Further, the second part 12 of the first insulating sheet 15 at which the terminals 42A and 42B and the second conductors 17A and 17B are provided is arranged within the minimum rectangular area S1 containing the first part 11 of the insulating sheet 15 at which the sensor portion 1 is provided. Since the second part 12 of the first insulating sheet 15 does not extend to the outside from the minimum rectangular area S1 containing the first part 11, the seating sensor 100 is housed within the minimum rectangular area S1 containing the first part 11. Accordingly, more seating sensors 100 can be formed on the insulating sheet as the material for the first insulating sheet 15 than in a case of another seating sensor having the same switch arrangement. Thus, the seating sensor 100 enables reduction in a material cost and inexpensive manufacturing.

Further, since the seating sensor 100 is housed within the minimum rectangular area S1 containing the first part 11 as described above, the seating sensor 100 can be reduced in size more than in a case of another seating sensor having the same switch arrangement. Accordingly, a degree of freedom of arrangement is improved when the seating sensor 100 is to be arranged in the seat 200.

Further, with the seating sensor 100 according to the present embodiment, since the AND circuit is constituted by a first switch group consisting of the switches 40A and 40B and a second switch group consisting of the switches 40C and 40D, a pressing force applied only to switches in either the first switch group or the second switch group is not determined as the seating of the occupant even when it is applied, which can prevent false detection. Further, the OR circuit is constituted by the switch 40A and the switch 40B in the first switch group, and the OR circuit is constituted by the switch 40C and the switch 40O in the second switch group. Accordingly, when at least one switch in the first switch group and at least one switch in the second switch group are turned on, the seating of the occupant can be detected. Hence, the seating of the occupant can be detected with excellent accuracy.

Second Embodiment

Figure 9:
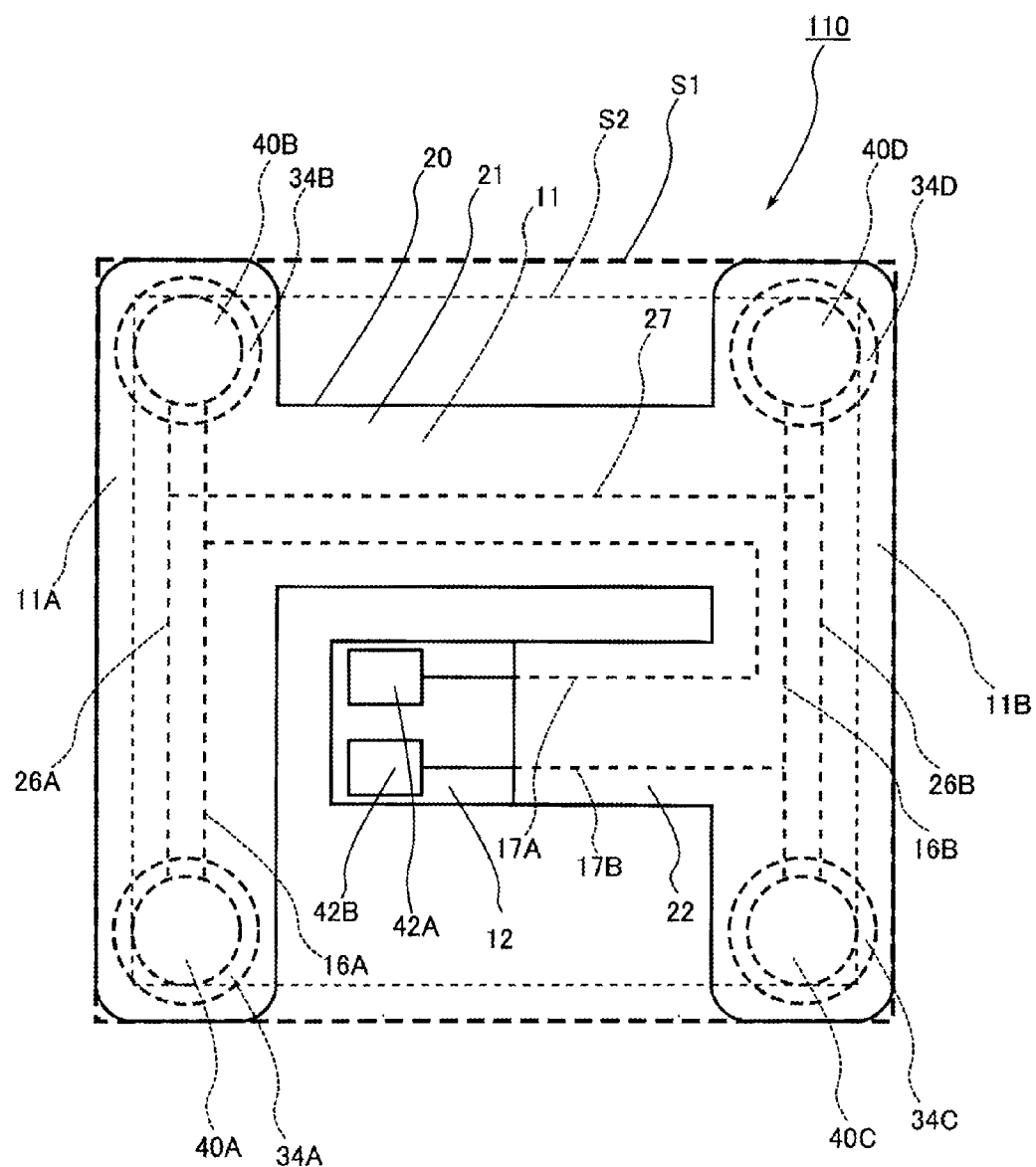
FIG. 9 is a plan view illustrating a seating sensor according to a second embodiment of the present invention.

Next, a second embodiment of the present invention will be described in details with reference to FIG. 9. Meanwhile, similar or identical components to those in the first embodiment are shown with the same reference numerals, and duplicate description is omitted. FIG. 9 is a plan view illustrating a seating sensor 110 according to the second embodiment of the present invention.

As shown in FIG. 9, the seating sensor 110 in the present embodiment differs from the seating sensor 100 in the first embodiment in that the second part 12 of the first insulating sheet 15 provided with the connector portion 2 is connected perpendicularly to the intermediate part of the lateral portion 11B of the first part 11.

With such a seating sensor 110, the second part 12 of the first insulating sheet 15 provided with the connector portion 2 can be bent centering on an axis in a direction perpendicular to a longitudinal direction of the second part 12. As for the bent part of the second part 12, a width direction of the second part 12 has a parallel relationship with a longitudinal direction of the lateral portion 11B, and a thickness direction of the second part 12 has a perpendicular relationship with the longitudinal direction of the lateral portion 11B. When the seating sensor 100 is to be arranged in the seat 200 under these relationships, the connector portion can be inserted in a hole provided in the cushion pad under the surface cover at the seat 200 in a case where the hole is in an elongated shape in a direction in which the person seated is directed on the surface of the cushion pad. In the inside of the seat 200, the terminals 42A and 42B are connected to the power supply and measuring portion.

Third Embodiment

Figure 10:
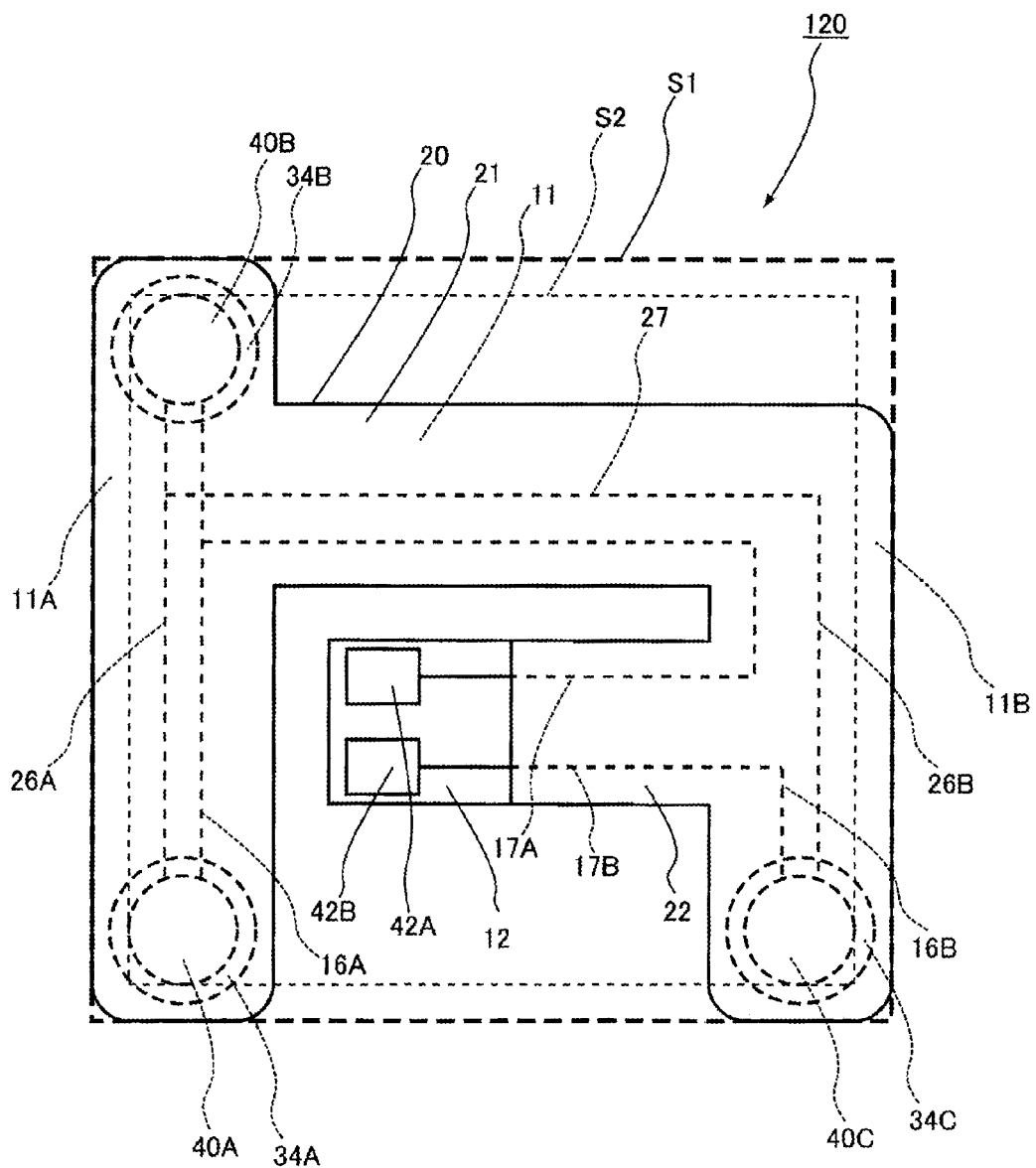
FIG. 10 is a plan view illustrating a seating sensor according to a third embodiment of the present invention.

Next, a third embodiment of the present invention will be described in details with reference to FIG. 10. Meanwhile, similar or identical components to those in the second embodiment are shown with the same reference numerals, and duplicate description is omitted. FIG. 10 is a plan view illustrating a seating sensor 120 according to the third embodiment of the present invention.

As shown in FIG. 10, the seating sensor 120 in the present embodiment differs from the seating sensor 110 in the second embodiment in that the switch 40D is not provided.

In this seating sensor 120, an OR circuit is constituted by the switch 40A and the switch 40B, and an AND circuit is constituted by a switch group, consisting of the switch 40A and the switch 40B, and the switch 40C.

With such a seating sensor 120, a manufacturing cost can be reduced as much as dispensation with the switch 40D, and the seating sensor can be manufactured more inexpensively.

Although the present invention has been described above taking the first to third embodiments as examples, the present invention is not limited to these.

For example, although the number of switches is four in the first and second embodiments, the present invention is not limited to this, and the number of switches may be five or more.

Further, although the first electrodes 14A to 14D and the second electrodes 24A to 24D of the respective switches 40A to 40D correspond to each other in shape and size and are overlapped with each other completely, the present invention is not limited to this, and the first electrodes 14A to 14D and the second electrodes 24A to 24D may differ from each other in size and shape as long as the pressing forces can be detected.

INDUSTRIAL APPLICABILITY

The present invention provides a seating sensor that is reduced in size and can be manufactured inexpensively.

DESCRIPTION OF REFERENCE NUMERALS

1 . . . Sensor portion
2 . . . Connector portion
10 . . . First electrode sheet
14A, 14B, 14C, 14D, 26A, 26B, 27 . . . First electrode
15 . . . First insulating sheet
16A, 16B, 16C, 16D . . . First conductor
17A, 17B . . . Second conductor
20 . . . Second electrode sheet
24A, 24B, 24C, 24D . . . Second electrode
25 . . . Second insulating sheet
30 . . . Spacer 34A, 34B, 34C, 34D ... Opening portion
35 ... Slit
40A, 40B, 40C, 40D ... Switch
42A, 42B ... Terminal
100, 110, 120 ... Seating sensor
200 ... Seat

The invention claimed is:

1. A seating sensor arranged in an inside of a seat to detect seating of a person, comprising:
   a film-form base table;
   a sensor portion having three or more switches conducted by a pressing force by the seating of the person and a first conductor connected to the respective switches, the first conductor arranged in a first imaginary rectangular area having a minimum length and a minimum width to cover all of the three or more switches; and
   a connector portion having a terminal and a second conductor connecting the terminal to the first conductor,
   wherein the base table includes a first part provided with the sensor portion and a second part provided with the connector portion, and
   the connector portion does not protrude beyond a second imaginary rectangular area that bounds the sensor portion, the first imaginary rectangular area being disposed within the second imaginary rectangular area,
   wherein four or more of the switches are provided, the four or more switches are constituted by a first switch group consisting of two or more of the switches and a second switch group consisting of the other two or more of the switches, the first switch group and the second switch group constitute OR circuits respectively, and the first switch group and the second switch group constitute an AND circuit.

2. A seating sensor arranged in an inside of a seat to detect seating of a person, comprising:
   a film-form base table;
   a sensor portion having three or more switches conducted by a pressing force by the seating of the person and a first conductor connected to the respective switches, the first conductor arranged in a first imaginary rectangular area having a minimum length and a minimum width to cover all of the three or more switches; and
   a connector portion having a terminal and a second conductor connecting the terminal to the first conductor,
   wherein the base table includes a first part provided with the sensor portion and a second part provided with the connector portion, and
   the connector portion does not protrude beyond a second imaginary rectangular area that bounds the sensor portion, the first imaginary rectangular area being disposed within the second imaginary rectangular area,
   wherein the first part includes a pair of strip-shape lateral members extending parallel with each other, and a strip-shape intermediate member connected between the pair of the lateral members, the intermediate member extending perpendicularly to the pair of lateral members, and
   wherein the second part extends from the first part.

3. A seating sensor arranged in an inside of a seat to detect seating of a person, comprising:
   a film-form base table;
   a sensor portion having three or more switches conducted by a pressing force by the seating of the person and a first conductor connected to the respective switches, the first conductor arranged in a first imaginary rectangular area having a minimum length and a minimum width to cover all of the three or more switches; and
   a connector portion having a terminal and a second conductor connecting the terminal to the first conductor,
   wherein the base table includes a first part provided with the sensor portion and a second part provided with the connector portion, and
   the connector portion does not protrude beyond a second imaginary rectangular area that bounds the sensor portion, the first imaginary rectangular area being disposed within the second imaginary rectangular area,
   wherein the first part includes a pair of strip-shape lateral members extending parallel with each other, and a connecting portion connected between the pair of the lateral members,
   wherein the connecting portion is connected to the respective lateral members at a position closer to one lateral end of the respective lateral members than the other lateral end of the respective lateral members, and
   wherein the second part extends toward the other end of the respective lateral members and is disposed within an area surrounded by the lateral members and the connecting portion.

* * * * *